Patented Feb. 23, 1926.

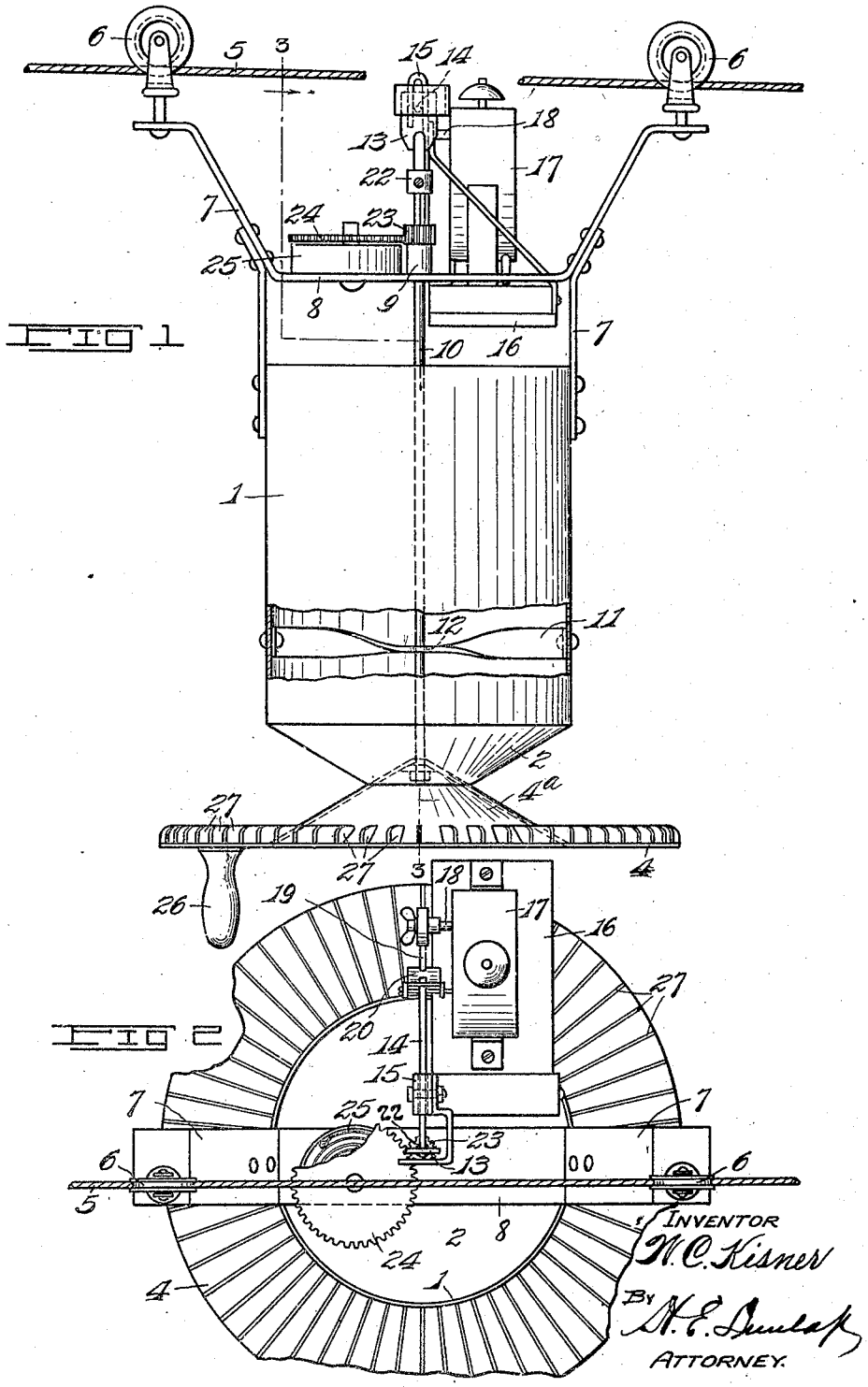

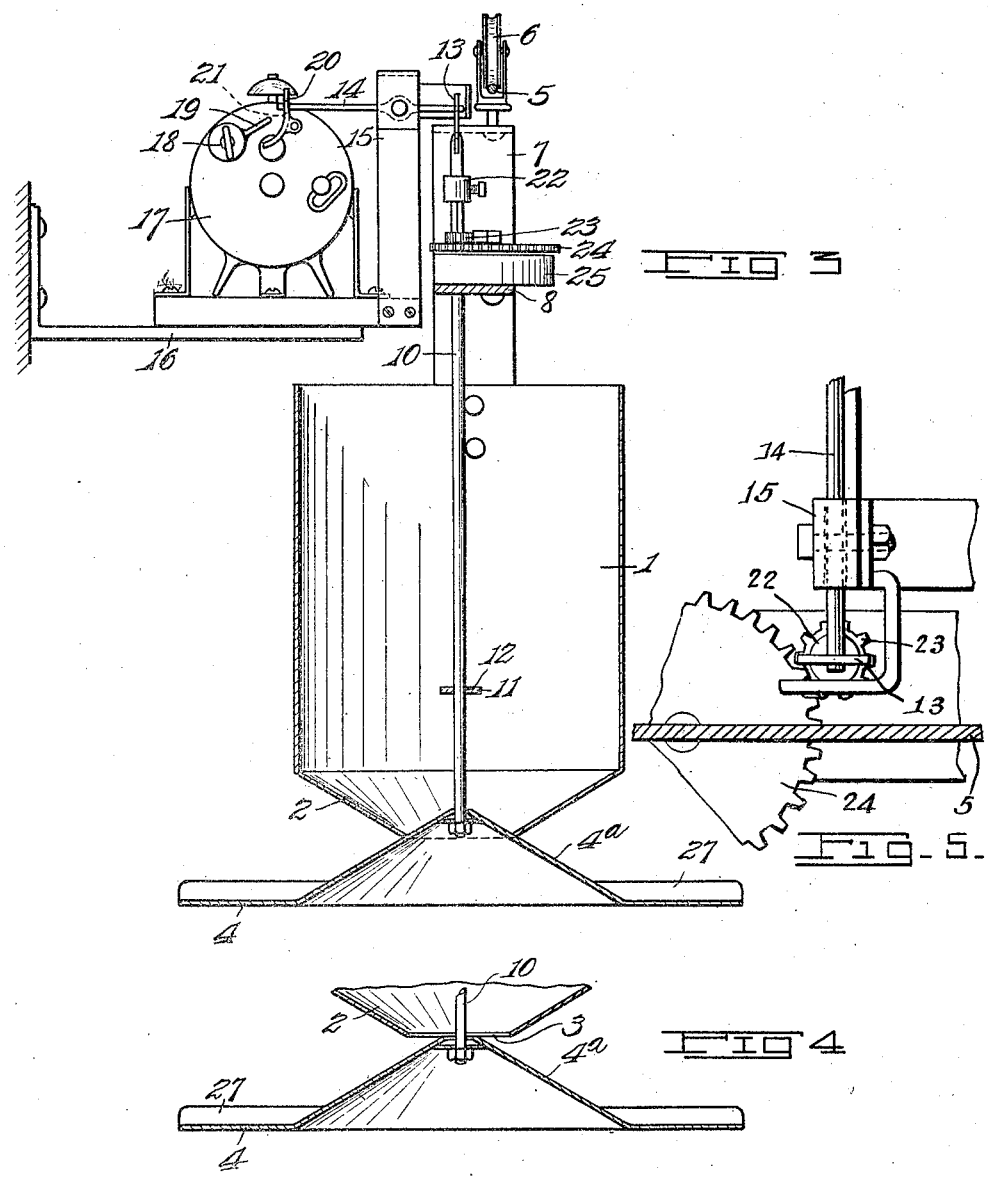

1,574,398

UNITED STATES PATENT OFFICE.

WILLIAM C. KISNER, OF WATSON, WEST VIRGINIA.

POULTRY-FEEDING APPARATUS.

Application filed November 26, 1923. Serial No. 676,911.

*To all whom it may concern:*

Be it known that I, WILLIAM C. KISNER, a citizen of the United States of America, and resident of Watson, county of Marion, and State of West Virginia, have invented certain new and useful Improvements in Poultry-Feeding Apparatus, of which the following is a specification.

This invention relates broadly to poultry feeders, and more specifically to an automatic feed-distributing apparatus.

The primary object of the invention is to provide apparatus designed for use in poultry houses, yards, or runways, whereby feed is distributed or scattered over a relatively large area.

A further object is to provide a device of the character mentioned adapted for travel along an inclined supporting wire or cable whereby distribution of the feed along the entire area traversed may be effected.

A still further object is to provide a device of the character mentioned which is so associated with a clock or clock mechanism that it is maintained inoperative until a predetermined time at which it is automatically released for operation.

With these and other objects in view, the invention resides in the features of construction, arrangement of parts and combination of elements which will hereinafter be fully described, reference being had to the accompanying drawings, in which—

Figure 1 is a side elevation of the invention;

Figure 2 is a top plan view, partially broken, of the same;

Figure 3 is a section on line 3—3, Fig. 1;

Figure 4 is a central section of the lower end portion of the feed container and the rotary distributor, the latter being shown in its lowered operative position; and Figure 5 is a partial plan view on a scale larger than that of Figure 2.

Referring to said drawings, 1 indicates a sheet metal feed container having a tapered bottom 2 provided with a central opening or discharge passage 3 which is normally maintained closed by an upright conical member 4ª formed on a vertically shiftable rotary feed distributor 4 that is suspended in a manner which will hereinafter be explained.

Said container 1 may be supported either stationarily or for travel, according to the area over which feed is to be distributed. As herein shown, it is supported for travel upon a wire cable 5 arranged to serve as a trackway, trolley-wheels or pulleys 6 being disposed to ride upon said cable and having depending hangers suitably attached to said container.

Carried by a hanger member or members 7, or, as herein shown for illustrative purposes, forming a part of the hangers, is a platform 8 which occupies a position elevated above the container 1. Fixed upon said platform is a sleeve-like bearing 9 in which is journaled an upright shaft 10 that extends centrally through the container 1 into supporting relation to the distributor 4, said distributor having the apex of its conical portion 4ª rigidly mounted upon said shaft. A diametrically disposed bar or metal strap 11 carried by said container adjacent to its lower end has therein an eye 12 through which said shaft extends, the same, in effect, constituting a second bearing for said shaft.

The upper end of the shaft 10 has a flat plate-like upper end portion 13 having therein an eye adapted for the reception of a suspension member by which said shaft is normally supported in an elevated position in which the cone portion 4ª of the feed distributor is held in closely-seated valve-like relation to the bottom 2 of the container 1 for maintaining closed the feed passage 3 of the latter. Said suspension member, as herein shown, consists of a substantially horizontal lever 14 which is pivoted intermediate its ends upon a suitable support, as an upright bracket 15, located in a stationary position lateral with respect to the supporting cable. Mounted stationarily upon a suitable support or bracket, as 16, at the side of the lever-carrying bracket 15 opposite that at which is located the upper end portion 13 of the shaft 10, is a clock 17 of alarm type having fixed on the outer end portion of its alarm-spring winding shaft 18 a fixed arm 19. Pivotally mounted intermediate its ends on the clock casing and having an annularly disposed or curved end portion adapted to be presented in the path of rotation of said arm 19 is a lever 20 having in its opposite end an eye 21 adapted for the reception of the adjacent end of the lever 14. With said end of the lever 14 received in the eye 21 of said lever 20, the latter is held by said lever 14 in a substantially horizontal position in which it is adapted to support stationarily on its opposite end the upper end of the elevated shaft 10, as aforesaid. Disposed in said position, the opposite curved end of the lever 20 is located in the path of movement of the arm 19, and said lever is consequently adapted, when said arm strikes forcibly against its said end, to be thereby swung to a position in which it releases the lever 14. So released, said lever 14 is swung by the weight of the parts suspended on its opposite end to an inclined position, in which the shaft 10 is allowed to slide therefrom.

When the suspended shaft 10 is released as aforesaid, said shaft immediately drops until an adjustable collar 22 carried thereby seats upon a gear pinion 23 which rests upon the top of the bearing 9 hereinbefore mentioned. This downward movement of said shaft results not only in lowering the feed distributor 4 to substantially the position shown in Fig. 4 for opening the feed passage 3 of the container 1, but also in said shaft being released for rotation in its bearings 9 and 12. A short length of said shaft, or that portion thereof which is slidable through the pinion 23, is of polygonal form in cross section, so that, while the shaft is freely movable in a lengthwise direction with respect to said pinion, rotation thereof is effected through rotation of said pinion.

The pinion is adapted to be rotated by a therewith engaged gear wheel 24 forming a part of a spring motor 25 which is mounted on the platform 8.

A handle 26 attached to the under side of the outer edge portion of the feed distributor 4 provides means whereby the latter may be rotated by hand for winding the spring of said spring motor 25, power for such winding being communicated through the shaft 10, pinion 23 and gear 24. Suitably spaced radial fins or blades 27 fixed upon the top face of the distributor 4 adjacent to its outer edge serve, when said distributor is rapidly rotated, to direct the feed delivered to the latter over a relatively wide area in a manner which is readily apparent.

It will be understood that the lever 14 serves not only as a support for the rotary shaft 10 when the latter occupies its elevated position, and as means for preventing rotation of the latter when said elevated position is occupied, but also as an anchor whereby the suspended feed distributing mechanism described is maintained stationary on the inclined trackway or cable 5 until it is actuated by the mechanism of the clock to release said shaft, as hereinbefore described.

While I have herein described a preferred embodiment of my invention, it is to be understood that various changes in the form and arrangement of some of the parts may be resorted to without departing from the spirit or scope of the appended claims.

What is claimed is—

1. A time feed distributing apparatus comprising a feed container supported in an elevated position and having a bottom opening, a vertically disposed rotary shaft, a centrifugal feed distributing device carried by said shaft, said shaft being vertically shiftable to and from a position in which said device closes said opening, means for supporting said shaft stationarily in its elevated position, time mechanism for releasing said shaft from said supporting means at a predetermined time, and means for rotating said released shaft.

2. A time feed distributing apparatus comprising a feed container supported in an elevated position and having a bottom opening, a centrifugal feed distributor shiftable into and out of closing relation to said opening, means for holding said distributor in its closing position, time mechanism whereby release of said distributor from said holding means is effected at a predetermined time, and means for rotating said distributor when released.

3. A time feed distributing apparatus comprising a feed container supported in an elevated position and having a bottom opening, a centrifugal feed distributor suspended in underlying relation to said container and shiftable vertically into and out of closing relation to said opening, means for supporting said distributor elevated in container closing position, time mechanism for effecting the release of said distributor from said supporting means at a predetermined time, and means for actuating said distributor to rotate when released.

4. A time feed distributing apparatus comprising, in combination with an inclined trackway, a feed container having a bottom opening, a carrier for said container arranged for travel along said trackway, a vertically shiftable rotary shaft, centrifugal feed distributing means adapted to be moved into and out of closing relation to said opening with elevating and lowering movements of said shaft, means for supporting said shaft stationarily in its elevated position and for preventing travel of said carrier, time mechanism for releasing said shaft from said supporting means at a predetermined time for permitting travel of said carrier along said trackway and for lowering said distributing means, and means for rotating the released shaft.

5. A time feed distributing apparatus comprising, in combination with an inclined trackway, a feed container arranged for travel along said trackway, said container having therein a discharge opening, means shiftable into and out of closing relation to said opening, means for supporting said shiftable means in closing position and for maintaining said container stationary on said trackway, and time-controlled means for disengaging the last mentioned means.

6. A time feed distributing apparatus comprising, in combination with an inclined trackway, a feed container arranged for travel along said trackway, said container having therein a discharge opening, means shiftable into and out of closing relation to said opening, means for holding said container stationary on said trackway and whereby said shiftable means are held in container closing position, time mechanism for disengaging said holding means, and means for rotating said shiftable means following release of the latter.

7. A time feed distributing apparatus comprising, in combination with an elevated trackway, a feed container disposed for travel on said trackway and having therein a discharge opening, a centrifugal feed distributing device, a rotary shaft upon which said device is carried, said shaft being shiftable for elevating and lowering said device into and out of closing relation to said opening, a pivoted support for holding said shaft in elevated position and whereby said container is maintained in stationary position on said trackway, clock-actuated means for effecting release of said shaft from its support at a predetermined time, and a spring motor for effecting rotation of said distributing device following the release of said shaft.

8. In a feed distributing apparatus, a feed container supported in an elevated position and having therein a discharge opening, means shiftable into and out of closing relation to said opening, means for holding said shiftable means in said relation, said holding means including a pivoted member, clock mechanism associated with said member and adapted to actuate the latter to release said shiftable means at a predetermined time to allow said shiftable means to move from container closing position, and means for automatically rotating the released shiftable means.

9. In combination, a wire cable, a poultry feeder suspended from said cable and mounted for movement along the latter, said feeder including a receptacle having an opening in the bottom thereof, a combined movable bottom and spreader normally closing said opening, a rod rising from said bottom through the receptacle, means cooperating with said rod for holding the feeder in a given position, and time controlled mechanism cooperating with said rod for holding the latter in an elevated position with said bottom closed, and operable to release said bottom at a predetermined time whereby said bottom gravitates to an open position, allowing the feeder to move along said cable.

In testimony whereof, I affix my signature.

WILLIAM C. KISNER.